US012331215B2

(12) United States Patent
Cafmeyer et al.

(10) Patent No.: US 12,331,215 B2
(45) Date of Patent: Jun. 17, 2025

(54) POWDER COATING RESINS FROM C12—C23 DIACIDS

(71) Applicant: Battelle Memorial Institute, Columbus, OH (US)

(72) Inventors: Jeffrey T. Cafmeyer, Columbus, OH (US); Daniel B. Garbark, Blacklick, OH (US)

(73) Assignee: Battelle Memorial Institute, Columbus, OH (US)

( * ) Notice: Subject to any disclaimer, the term of this patent is extended or adjusted under 35 U.S.C. 154(b) by 273 days.

(21) Appl. No.: 16/965,003

(22) PCT Filed: Jan. 25, 2019

(86) PCT No.: PCT/US2019/015234
§ 371 (c)(1),
(2) Date: Jul. 26, 2020

(87) PCT Pub. No.: WO2019/147994
PCT Pub. Date: Aug. 1, 2019

(65) Prior Publication Data
US 2021/0054230 A1 Feb. 25, 2021

Related U.S. Application Data

(60) Provisional application No. 62/622,178, filed on Jan. 26, 2018.

(51) Int. Cl.
C09D 177/12 (2006.01)
C08G 69/44 (2006.01)
C09D 5/03 (2006.01)

(52) U.S. Cl.
CPC ........... C09D 177/12 (2013.01); C08G 69/44 (2013.01); C09D 5/03 (2013.01)

(58) Field of Classification Search
CPC .... C08G 63/685; C08G 69/44; C09D 167/00; C09D 167/02; C09D 177/12; C09D 5/03
See application file for complete search history.

(56) References Cited

U.S. PATENT DOCUMENTS

| | | | |
|---|---|---|---|
| 3,331,886 A | 7/1967 | Zimmerman et al. | |
| 3,772,231 A | 11/1973 | Satoru et al. | |
| 4,048,252 A | 9/1977 | Behmel | |
| 4,248,978 A | 2/1981 | de Cleur et al. | |
| 5,034,297 A | 7/1991 | Yoerger | |
| 5,439,988 A * | 8/1995 | Moens ................. | C08G 63/199 528/307 |
| 2005/0277745 A1 | 12/2005 | Walrath et al. | |
| 2006/0229400 A1 | 10/2006 | Fletcher | |
| 2009/0264672 A1* | 10/2009 | Abraham ............. | B01J 31/2278 562/595 |
| 2010/0028582 A1 | 2/2010 | Joch et al. | |
| 2010/0029894 A1 | 2/2010 | Warakomski et al. | |
| 2010/0113689 A1 | 5/2010 | Naiki et al. | |
| 2011/0028679 A1 | 2/2011 | Mao et al. | |
| 2011/0244157 A1 | 10/2011 | Singer et al. | |
| 2012/0004373 A1 | 1/2012 | Beccaria et al. | |
| 2013/0209812 A1 | 8/2013 | Gorodisher et al. | |
| 2014/0364581 A1 | 12/2014 | Hunt et al. | |
| 2016/0009953 A1 | 1/2016 | Erdodi et al. | |
| 2016/0060480 A1* | 3/2016 | Mody .................. | C08G 63/199 524/604 |
| 2016/0222221 A1 | 8/2016 | Saito et al. | |
| 2017/0233605 A1 | 8/2017 | Erdodi et al. | |

FOREIGN PATENT DOCUMENTS

| | | |
|---|---|---|
| CN | 1760295 A | 4/2006 |
| EP | 0002464 A1 | 6/1979 |
| GB | 994717 | 1/1963 |
| GB | 1043098 | 11/1964 |
| GB | 2231334 A | 11/1990 |
| JP | 2005528487 A | 9/2005 |
| JP | 2009507086 A | 2/2009 |
| JP | 2011504539 A1 | 2/2011 |
| JP | 2012051964 A | 3/2012 |
| WO | 9821264 A1 | 5/1998 |
| WO | 9916810 | 4/1999 |
| WO | 0056804 | 9/2000 |
| WO | 2014193713 A1 | 12/2014 |
| WO | 2018022810 A1 | 2/2018 |

OTHER PUBLICATIONS

Key Kobayashi et al "Studies on the Synthetic Fibre of the Polyester Amide" 1958 (Year: 1958).*
Florian Stempfle et al "Long-Chain Aliphatic Polymers to Bridge the Gap between Semicrystalline Polyolefins and Traditional Polycondensates", Chem. Rev. 2016, 116, 4597-4641 (Year: 2016).*
Murase et al "Poly(Ester Amide)s: Recent Developments on Synthesis and Applications", Natural and Synthetic Biomedical Polymers, 2014, pp. 145-166 (Year: 2014).*
Allyson Beuhler "C18 Diacid Market to Grow and Expand Into an array of novel products with superior properties", Elevance, Sep. 16, 2013. (Year: 2013).*

(Continued)

Primary Examiner — Frances Tischler
Assistant Examiner — Gennadiy Mesh
(74) Attorney, Agent, or Firm — Greer, Burns & Crain, Ltd.

(57) ABSTRACT

Powder coating resins and coatings made using the powder coating resins are described. The powder coating resins are based on the use of $C_{12}$ to $C_{23}$ diacids. The $C_{12}$ to $C_{23}$ diacids are reacted with a reactant having an alcohol functionality and an amine functionality to form a carboxylic acid terminated polymer having ester and amide functionality. Alternatively, the $C_{12}$ to $C_{23}$ diacids are reacted with a reactant having an alcohol functionality and an amine functionality to form an intermediate polyol, which is then reacted with acetoacetic acid or an ester thereof to form an acetoacetate-terminated polymer.

5 Claims, No Drawings

(56) References Cited

OTHER PUBLICATIONS

Borriello et al "Poly(amide-ester)s Derived from Dicarboxylic Acid and Aminoalcohol", Journal of Applied Polymer Science, vol. 95, 362-368 (2005) (Year: 2005).*

Clément Girard et al "Synthesis and characterization of poly(ester amide amide)s of different alkylene chain lengths" Polym. Bull. (2019) 76:495-509 (Year: 2018).*

Patil et al "Synthesis of bio-based polyurethane coatings from vegetable oil and dicarboxylic acids", Progress in Organic Coatings 106 (2017) 87-95 (Year: 2017).*

International Preliminary Report on Patentability from corresponding PCT application No. PCT/US2019/015236 issued on Jul. 28, 2020.

International Preliminary Report on Patentability from corresponding PCT application No. PCT/US2019/015234 issued on Jul. 28, 2020.

International Search Report from PCT/US2019/015236, mailed Apr. 12, 2019.

Written Opinion from PCT/US2019/015236, mailed Apr. 12, 2019.

International Search Report from PCT/US2019/015234, mailed Apr. 12, 2019.

Written Opinion from PCT/US2019/015234, mailed Apr. 12, 2019.

Sharma, Bhaskar, Synthesis and Characterization of Alternating Poly(amide urethane)s, 2004.

* cited by examiner

POWDER COATING RESINS FROM C12—C23 DIACIDS

CROSS-REFERENCE TO RELATED APPLICATIONS

This application is a U.S. National Phase under 35 U.S.C. § 371 of International Application No. PCT/US2019/015234, filed Jan. 25, 2019 which claims the benefit of U.S. Patent Application No. 62/622,178, entitled Soybean Based Powder Coating Resins from C16-C23 Diacids or Derivatives, filed Jan. 26, 2018 the contents of each of which are incorporated by reference in their entirety.

BACKGROUND

The popularity of powder coatings continues to expand, and these coatings are gradually replacing traditional liquid paints and coatings for appliances, automotive parts and a wide range of consumer goods. This is driven by the attractive combination of solvent-free and high transfer efficiency processes. While the vast majority of powder coatings are applied to metal parts and components, significant growth opportunities exist for coating heat sensitive substrates such as wood, plastics, and composites. Powder coating these materials requires formulations which cure at lower temperatures and yet maintain stable storage and powder transfer characteristics as well as high reactivity. Ultra-low bake formulations have been introduced to address this burgeoning market. These systems are based on traditional petroleum based polyester resins, which are principally responsible for the physical and chemical properties of the powder coating formulation.

Polyesters are the workhorse resin system for thermosetting powder coatings with numerous compositional variations enabling their versatility and use in a wide range of applications. Constructed by the condensation polymerization of alcohols and carboxylic acids from a diverse assortment of aliphatic and aromatic derivatives, polyester resins are designed for both their powder characteristics and their ultimate coating performance. For thermal cured systems, this means that the resin must be able to be converted into a powder via the formulation processes, remain stable under shipping and storage conditions, and be cured at elevated temperature to a final coating with the expected properties. As cure conditions are reduced, primarily temperature but also with respect to time, the thermal characteristics of the resin may need to be adjusted to provide the necessary flow, leveling and film formation when the resin is melted and cure is activated on the substrate. However, the extent of the ability to make these changes is limited and often runs counter to both powder stability as well as coating performance. The standard polyester building blocks (e.g., terephthalic acid, isophthalic acid, adipic acid, sebacic acid, neopentyl glycol, trimethylol propane, etc.) have a long history of use in conventional powder coatings at higher temperatures, but have not been combined in a manner to bring a full solution to this low-temperature cure need. This is due to the limited range of some of the key physical properties of these building blocks, due to their petroleum-based origin.

Therefore, there is a need for improved powder coatings, powder coating resins, and method of making a powder coating.

DESCRIPTION OF THE INVENTION

This application relates to the composition of polymer resins from aliphatic $C_{12}$ to $C_{23}$ diacids, to powder coatings made from the polymer resins, and to methods od making the polymer resins. These resins contain amide and ester functionality and reactive carboxylic or acetoacetoxy terminal functionality which allow for the curing of the resin with a crosslinking agent to form a thermoset polymer useful for coatings and powder coating applications in particular. With suitable physical characteristics to be pulverized into a free-flowing powder, the resins also exhibit relatively low melting points, low melt viscosity, low solubility in common solvents and reactivity with conventional curing agents which makes them particularly amenable to low-temperature cure powder coatings and specifically for coating of heat-sensitive substrates. In addition, in some cases, the desirable $C_{12}$ to $C_{23}$ diacids used in these resins may be sourced from biobased feedstocks such as fatty acids from soybeans Biobased polyester building blocks, such as triglyceride oils and associated fatty acids, have been adapted and converted for use in coating applications due to their range of physical properties such as flexibility and hydrophobicity.

Research into biobased materials for resin development offers an approach which introduces new building blocks with characteristics and features which can be leveraged to meet the shift in requirements for heat sensitive substrates. In addition, incorporating biobased resins from renewable feedstocks such as soybean oil introduces the aspect of sustainability which has particular appeal in the coating of wood products such as hardwood products or medium-density fiberboard (MDF). MDF is currently one of the largest opportunities for expansion of powder coatings, as it is used in a variety of consumer products including ready-to-assemble furniture, cabinetry, countertops and other building materials, store displays and point-of-purchase (POP) installations, and a broad range of other products for home and office.

The oleochemical industry continues to introduce new products derived from animal fats and vegetable oils that are not easily obtained from petroleum feedstocks. One such emerging product family is aliphatic α,ω-long-chain diacids which are commercially prepared from fatty acids via fermentation or olefin metathesis pathways. The chemical conversion of readily available fatty acids results in a $C_{18}$ diacid building block, octadecanedioic acid, which is similar yet significantly different than the petroleum based $C_6$ adipic acid or even biobased $C_9$ azelaic acid.

Prior experience with these long-chain diacids included observations of interesting melting characteristics of long-chain diester and amide derivatives with sharp, relatively high melting points. It was hypothesized that long-chain diacid resin analogs would possess greater solvent resistance, hydrolytic stability, toughness and flexibility relative to the properties of short-chain aliphatic systems, and that these resin analogs could be designed to possess appropriate melt characteristics suitable for a low-temperature powder coating resin. To be an effective improvement over current resins, a target cure temperature of 125° C. or less is particularly desirable for a low-temperature powder coating for heat sensitive substrates.

A powder coating technology based on the use of $C_{12}$ to $C_{23}$ diesters was developed as described in PCT Application Serial Number PCT/US2019/015236, entitled Powder Coating Resins from C12-C23 Diesters, (U.S. application Ser. No. 16/965,004), filed on even date herewith, which is incorporated herein by reference in its entirety.

The first type of resin was prepared via classical condensation polymerizations of $C_{12}$ to $C_{23}$ diacids with different amino alcohols creating a wholly aliphatic, carboxyl functional polyester-amide resin binder as illustrated below. The molecular weight, acid value, and functionality were controlled through selective stoichiometry of acid groups with amines and alcohols, resulting in a resin with reactive carboxylic acid functionality. The molecular weight of the resin is typically more than 475 g/mol and less than 10,000 g/mol, or more than 475 g/mol and less than 7,500 g/mol, or more than 475 g/mol and less than 5,000 g/mol. As the molecular weight increases, the acid value of the resin decreases which is determined as the amount of potassium hydroxide required to neutralize the acid functionality in a gram of resin with units of mgKOH/g.

A generalized resin synthesis scheme of a $C_{18}$ carboxylic acid functional diacid polyester-amide resin is shown below. The branched functionality due to incorporation of diethanolamine has been omitted for clarity.

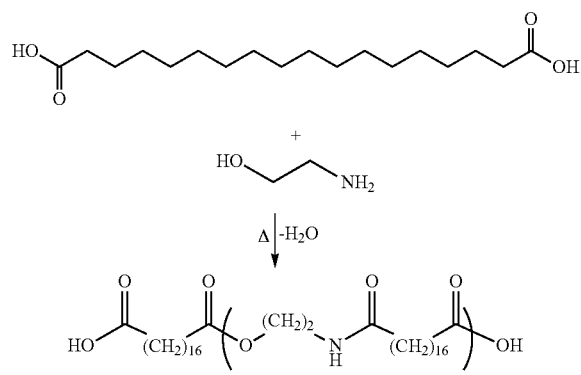

The resin technology of the present invention is based on the use of $C_{12}$ to $C_{23}$ diacids in powder coating resins and powder coatings made using the powder coating resins.

The diacids used comprise $C_{12}$ to $C_{23}$ diacids, or $C_{16}$ to $C_{23}$ diacids, or $C_{18}$ to $C_{23}$ diacids. Mixtures of diacids can be used. Mixtures of diacids include mixtures of two or more $C_{12}$ to $C_{23}$ diacids. Some mixtures include one or more $C_{18}$ to $C_{23}$ diacids with one or more $C_{12}$ to $C_{16}$ diacids. In addition, one or more $C_{12}$ to $C_{23}$ diacids can be mixed with one or more $C_2$ to $C_{11}$ diacids.

The $C_{12}$ to $C_{23}$ diacids can be produced from petroleum or biobased sources. Biobased $C_{12}$ to $C_{23}$ diacids can come from the microbial fermentation of fatty acids, the microbial fermentation of sugar, the chemical oxidation of fatty acids, the metathesis of fatty acids or fatty esters, and the methoxycarbonylation of fatty acids or fatty esters. Fatty acids and fatty acid esters are derived from animal fats, algal oils, and plant or vegetable oils, including, but not limited to, soybean oil, canola oil, rapeseed oil, sunflower oil, palm oil, cottonseed oil, corn oil, safflower oil, and tall oil, and including high oleic variations.

The $C_{12}$ to $C_{23}$ diacids are reacted with a reactant having an alcohol functionality and an amine functionality. The reactants can have primary or secondary amine functionality, and/or primary or secondary alcohol functionality. They can be mono- or polyfunctional amine and/or mono- or polyfunctional alcohols.

The reactant can be an amine alcohol, or a mixture of a polyamine and a polyol, or a mixture of an amine alcohol and a polyamine, or a mixture of an amine alcohol and a polyol, or combinations thereof.

Suitable amine alcohols include, but are not limited to, amine monoalcohols and amine polyols. Examples include, but are not limited to, ethanolamine, N-methyl ethanolamine, 1-amino-2-propanol, 2-amino-1-propanol, 3-amino-1-propanol, 3-amino-1-butanol, 4-amino-2-butanol, 3-amino-2-methyl-1-propanol, 3-amino-2-methyl-1-butanol, 4-amino-3-methyl-2-butanol, 2-(aminomethyl)-1-butanol, 3-amino-2,2-dimethyl-1-propanol, 4-amino-2-pentanol, 1-amino-3-pentanol, 3-amino-1-pentanol, 4-amino-2-methyl-2-butanol, 3-amino-3-methyl-1-butanol, 3-amino-2-(aminomethyl)-1-propanol, diethanolamine, 3-amino-1,2-propanediol, 2-(aminomethyl)-1,3-propanediol, 3-amino-1,5-pentanediol, 2-amino-1,4-butanediol, or combinations thereof. Amine alcohols also include N-alkyl-substituted amine alcohols with alkyl groups having 1-10 carbon atoms.

Suitable polyamines include, but are not limited to, ethylene diamine, propylene diamine, butane diamine, pentane diamine, hexamethylene diamine, or combinations thereof.

Suitable polyols include, but are not limited to, ethylene glycol, propylene glycol, 1,3-propandiol, 1,4-butanediol, 1,5-pentanediol, or combinations thereof.

The ratio of the amine functionality to the alcohol functionality can be adjusted to increase or decrease the physical properties (e.g., melting point temperature) of the resin. For example, increasing the number of amide groups often raises the melting point temperature and reduces solubility in common solvents. Increasing the ester groups can reduce the melting point temperature.

The resin mixture can also include carboxylic acid terminated polymers having ester and amide functionality which are the reaction product of a polyol and a first diacid. The polyol is the reaction product of a $C_{12}$ to $C_{23}$ diester and a reactant comprising an amine alcohol or a mixture of a polyamine and a polyol, or a mixture of an amine alcohol and a polyamine, or a mixture of an amine alcohol and a polyol, or combinations thereof. The $C_{12}$ to $C_{23}$ diester used in this carboxylic acid terminated polymer has a different number of carbon atoms from the carboxylic acid terminated polymer made with the $C_{12}$ to $C_{23}$ diacid. This third carboxylic acid polymer is present in an amount of less than 50 wt % of the resin. The first diacid may comprise a short-chain diacid such as oxalic acid, malonic acid, succinic acid, glutaric acid, adipic acid, pimelic acid, suberic acid, azelaic acid, sebacic acid, decanoic acid and undecanedioic acid, brassylic acid or combinations thereof. Suitable amine alcohols, polyamines, and polyols for use in this reaction are described above.

The resins produced can have an acid value in the range of 20-90 mg KOH/g, or 30-70 mg KOH/g, or 40-50 mg KOH/g, or 43-47 mgKOH/g. The acid value is achieved by the excess amount of diacid relative to the amount of amine alcohols, polyamines, and polyols used. Diacid is used in excess to ensure that there are carboxylic acids groups available for reaction with the cross-linking agent in the formulated powder coating.

The resins can have a peak melting point of 90-130° C., or 118-123° C.

The resins can have a viscosity of less than 4000 centipoise at 125° C., or less than 3000 centipoise, or less than 2000 centipoise, or less than 1000 centipoise, or 700 to 900 centipoise.

The resins can be produced without an added catalyst, if desired. This is advantageous because typical polyester resins require a catalyst, and some catalysts have health concerns.

The resins can be formulated into a powder coating. The formulation includes a cross-linker which can react with the carboxylic acid end groups. Suitable cross-linkers include, but are not limited to, epoxy cross-linker compounds and resins, hydroxyalkylamide (HAA) cross-linkers, or combinations thereof, and the like. Epoxy type cross-linkers include, but are not limited to, triglycidyl isocyanurate (TGIC), glycidylesters, glycidylmethacrylate resins, aliphatic oxiranes, or combinations thereof, and the like The powder coating formulation can include other components typically included in powder coating compositions as are known in the art. These additional components can include, but are not limited to, one or more of the following: catalysts, flow agents, promoters, degassers, pigments, pigment dispersing aids, fillers, UV absorbers, light stabilizers, antioxidants, antistatic/charge control additives, tribo-charging additives, anti-caking additives, mar resistance additives, slip agents, texturizing additives, matting agents, and the like.

The powder coating can be applied electrostatically to a substrate and thermally cured. The cure time is typically less than 30 min, or less than 20 min, or less than 10 min, or less than 5 min, or less than 3 min.

The powder coating can be cured at temperatures in the range of 120-220° C. Typical coatings cured at temperatures in the range of 180-220° C., while others cured at temperatures in the range of 150-170° C., and others cured in the range of 125-140° C.

The powder coating has good appearance aesthetics and useful properties including gloss (e.g., greater than 60 gu at 60°), adhesion (e.g., 5B), flexibility (e.g., 160 in-lb forward and reverse impact), and solvent resistance (e.g., 100 double rub with MEK). The power coatings have shown excellent durability with QUV-B accelerated weathering tests.

The specific $C_{12}$ to $C_{23}$ diacids, amine alcohols, polyamines, and/or polyols, and the amounts used to produce the powder coating resin can be selected to obtain the properties needed for a particular application. Some applications have higher requirements for physical properties than other applications. Thus, while a powder coating resin might not be acceptable for one application with high physical property requirements, it could be acceptable for other applications which do not require the same level of physical properties.

Longer $C_{18}$ to $C_{23}$ diacids generally lead to better properties with respect to chemical resistance than shorter $C_{12}$ to $C_{16}$ diacids.

The second type of resin contains ester and amide functionality. It has acetoacetate (AcAc) terminal functionality. In this chemistry, a polyol is produced by reacting $C_{12}$ to $C_{23}$ diacid with an amine alcohol, or a mixture of a polyamine and a polyol, or a mixture of an amine alcohol and a polyamine, or a mixture of an amine alcohol and a polyol, or combinations thereof. The polyol is then esterified or transesterified with acetoacetic acid or an ester thereof. The reaction sequence for a $C_{18}$ diacid with diethanolamine to form a tetra-AcAc functionality is shown below.

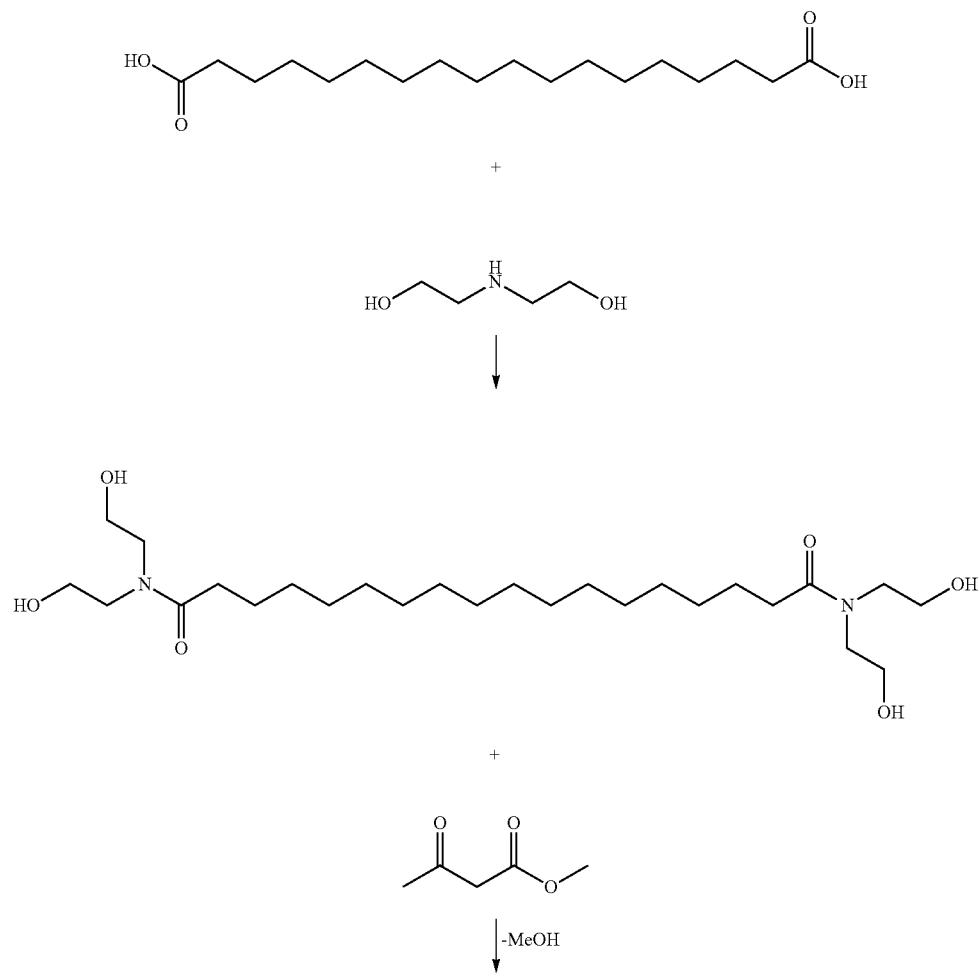

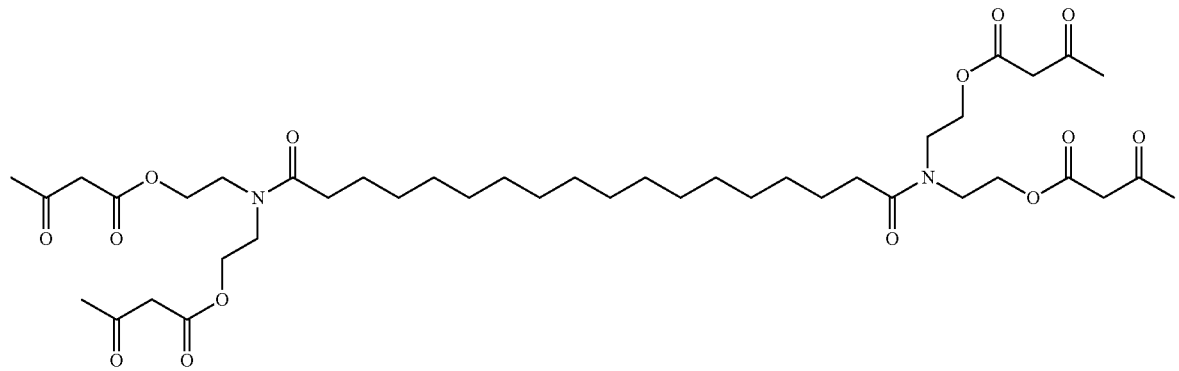

Suitable acetoacetylating compounds include, but are not limited to, acetoacetic acid or an ester thereof. Suitable esters include, but are not limited to, t-butyl acetoacetate and ethyl acetoacetate.

The diacids, amine alcohols, polyamines, and polyols used here are as described above.

Suitable cross-linkers for the acetoacetate terminated polyols include, but are not limited to, polyisocyanates, polyaldehydes, melamine resins, and unsaturated compounds suitable for Michael addition reactions, or combinations thereof.

EXAMPLES

Example 1. Octadecanedioic Acid Based Powder Coating Resin 8.40 kg of octadecanedioic acid was weighed into a flask containing a mechanical stirrer, 1.30 kg ethanolamine, and 139.92 g diethanolamine. A short path distillation apparatus, heating mantle, and thermocouple were attached. The mixture was heated to 150° C. and held for 0.75 hrs. The temperature was then raised to 200° C. over 1.75 hrs. An argon headspace flow of 1 standard cubic foot per hour (SCFH) was then applied, and heating continued to 210° C. over 40 minutes and was held there for 0.5 hr. The molten product was poured into aluminum trays. Once cool, the solid was broken into pieces and transferred to bags. This resulted in 8.97 kg of powder coating resin (99.7% mass balance). The acid value was found to be 48.5 mgKOH/g via titration in dimethylformamide.

Example 2. Nonadecanedioic Acid Based Powder Coating Resin 30.016 g of nonadecanedioic acid was weighed into a flask containing a stirbar, 4.467 g ethanolamine, and 0.491 g diethanolamine. A short path distillation apparatus, heating mantle, and thermocouple were attached. The mixture was heated to 150° C. for 0.5 hrs. The temperature was then raised to 160° C. for 1 hr, followed by 180° C. for 1.25 hrs, and 200° C. for 3 hrs. Finally, the temperature was raised to 210° C. for 1 hr, and the product was poured into a crystallization dish. Once cool, the solid was broken into pieces and transferred to a jar. The acid value was found to be 42.5 mgKOH/g via titration in dimethylformamide.

Example 3. Azelaic Acid Based Powder Coating Resin 423.14 g of azelaic acid was weighed into a flask containing a stirbar, 110.17 g ethanolamine, and 11.85 g diethanolamine. A short path distillation apparatus, heating mantle, and thermocouple were attached. The mixture was heated to 150° C. for 1.5 hrs. The temperature was then raised to 160° C. for 1.25 hrs, followed by 180° C. for 1.25 hrs, and 200° C. for 4.25 hrs. Finally, the temperature was raised to 210° C. for 1.25 hrs, and the product was poured into a crystallization dish. Once cool, the product was a low melting wax with slight tackiness at room temperature.

Example 4. Octadecanedioic Acid Bis(diethanolamide)

125.00 g of octadecanedioic acid was weighed into a flask containing a stirbar and 104.73 g of diethanolamine. A short path distillation apparatus, heating mantle, and thermocouple were attached. The mixture was heated to 210° C. for 19 hours replenishing any distilled diethanolamine. The bulk diethanolamine was removed by partitioning 50:50 isopropyl alcohol:ethyl acetate with 20 wt % potassium carbonate. The resulting product was dissolved into acetone and precipitated in the refrigerator. The solid was filtered and dried in a vacuum oven. The final product was 99.71 g of a tan solid.

Example 5. Acetoacetate Capped Octadecanedioic Acid Bis(diethanolamide)

90 g of the octadecanedioic acid bis(diethanolamide) was weighed into a flask containing a stirbar and 103.14 g of methyl acetoacetate. A short path distillation apparatus, heating mantle, and thermocouple were attached. The mixture was heated to 150° C. for 4.5 hours. The mixture was then placed on a Kugelrohr distillation apparatus at 100° C. at 1.5 mm Hg for 1.5 hours, resulting in 154.33 g of a viscous oil.

Example 6. Acetoacetate Capped Octadecanedioic Acid Bis(ethanolamide)

275.00 g of octadecanedioic acid was weighed into a flask containing a stirbar and 60.61 g of ethanolamine. A short path distillation apparatus, heating mantle, and thermocouple were attached. The mixture was heated to 150° C. for 4 hrs, followed by 165° C. for 6.25 hrs, and 200° C. for 4 hrs. The mixture was cooled, and 231.73 g of methyl acetoacetate was added to the mixture. The mixture was heated to 150° C. for 4.5 hours. The mixture was then heated to 130° C. for 1 hr, followed by 140° C. for 3.5 hrs, and 150° C. for 9 hrs. The temperature was then adjusted to 140° C., and the mixture was placed under aspirator vacuum for 3 hrs. The mixture was poured into a crystallization dish and ground. The solid was then placed in a vacuum oven at 70° C. at 1.7 mm Hg for 1 day, followed by a second day at 80° C. and 1.7 mm Hg. The product was a solid with slight tackiness.

The resins were characterized by thermal analysis using differential scanning calorimetry (DSC) and rheometry to identify a peak melting temperature and the melt viscosity at 125° C. The results are shown in Table 1.

TABLE 1

| Resin ID | Description | Acid Value mgKOH/g | Peak Melting Point, (° C.) | Viscosity cP@ 125° C. |
|---|---|---|---|---|
| 1 | C19 diacid | 42.5 | 121 | N/A |
| 2 | C18 diacid | 44.8 | 119 | N/A |
| 3 | C16 diacid | 45.1 | 118 | 857 |
| 4 | C14 diacid | 44.8 | 118 | 737 |
| 5 | C12 diacid | 45.9 | 105 | 826 |
| 6 | 80% C18 diacid-20% C9 diacid | 48.7 | 93 | N/A |
| 7 | C18 diacid 1-amino-2-propanol | 49.8 | 108 | 536 |
| 8 | C18 diacid | 25.3 | 121 | 1243 |
| 9 | C18 diacid | 44.9 | 120 | 884 |
| 10 | C18 diacid | 68.7 | 114 | 553 |

The resin, available as a coarse granulate, was processed using conventional powder processing techniques into a formulated powder. Lab samples were premixed using a Vitamix 3600 for approximately 10 seconds. Compounding was accomplished using a 19 mm co-rotating twin screw extruder using a standard screw design with an L/D (length over diameter) of approximately 16. The barrel is divided into three equal zones: 1. Full cool feed zone, 2. 120-125° C. transition zone, and 3. 120-125° C. end zone. Screw speed was 500 RPM. The extrudate temperature was measured at approximately 125° C. The extrudate was rather viscous and was difficult to process through chilled rolls having a tight nip. The laboratory extrudate was collected in bulk and not through chill rolls.

The cooled extrudate was processed by manual fracture and then pulverized using a number of conventional lab grinding techniques. Small samples were ground using a Strand mill. A Retsch model ZM-1 mill was also used with a six hammer rotor and a 0.75 mm screen. Larger samples were processed with a Mikropul Bantam mill. Higher yields were augmented by soaking the extrudate in dry ice. Pan sieves were used for lab sized samples and a Kemutec rotary sifter was used for larger samples. Sieve mesh size was 140 US or 100 microns.

A powder coating formulation was made with the resins which included the resin, crosslinker, a degasser, a flow agent, a catalyst, and a pigment. Apart from the resin and crosslinker, the materials and amounts used were the same proportion in each formulation.

The formulated powders were electrostatically applied to steel laboratory test panels (Q-Panel) using conventional methods. Powder application was achieved using a Nordson Encore Model LT manual spray gun at 90 KV charge setting. Powder was applied at a film thickness of 1.5 to 3.0 mils (37 to 75 microns). Coated test panels were baked in an electric laboratory oven and allowed to reach the designated cure temperature. The panels were held at this temperature+/−5° F. for the designated time. The coated test panels were retrieved from the oven and allowed to cool to room temperature. The coated test panels were subjected to subsequent film testing.

The film testing involved the evaluation of appearance properties (color ASTM D-2244, specular gloss ASTM D-523, surface profile PCI Smoothness Standards 1 through 10), mechanical (adhesion ASTM D-3359B, impact resistance ASTM D-2794) and durability (solvent resistance ASTM D-5402, corrosion resistance ASTM B-117 and UV durability ASTM D-4587). The formulation and cure details are shown in Table 2 and testing results are shown in Table 3.

TABLE 2

| Coating ID | Description | Acid Value mgKOH/g | Crosslinker | Resin-Crosslinker Ratio | Bake Schedule (min) |
|---|---|---|---|---|---|
| A | C19 diacid | 42.5 | TGIC | 90/10 | 25 @ 135° C. |
| B | C18 diacid | 44.8 | TGIC | 90/10 | 20 @ 135° C. |
| C | C16 diacid | 45.1 | TGIC | 90/10 | 20 @ 135° C. |
| D | C14 diacid | 44.8 | TGIC | 90/10 | 20 @ 135° C. |
| E | C12 diacid | 45.9 | TGIC | 90/10 | 20 @ 135° C. |
| F | 80% C18 diacid-20% C9 diacid | 48.7 | TGIC | 90/10 | 25 @ 135° C. |
| G | C18 diacid 1-amino-2-propanol | 49.8 | TGIC | 90/10 | 20 @ 135° C. |
| H | C18 diacid low acid value | 25.3 | TGIC | 95/5 | 20 @ 135° C. |
| I | C18 diacid high acid value | 68.7 | TGIC | 87/13 | 20 @ 135° C. |

TABLE 3

| Coating ID | Description | 60° Gloss | Solvent Resistance 100 DR MEK | Crosshatch Adhesion | Impact Resistance (in-lb) Direct | Impact Resistance (in-lb) Reverse |
|---|---|---|---|---|---|---|
| A | C19 diacid | 78.5 | No Effect | 5B | 160 | 160 |
| B | C18 diacid | 64.3 | No Effect | 5B | 160 | 160 |
| C | C16 diacid | 54.7 | No Effect | 5B | 140 | 120 |
| D | C14 diacid | 62.5 | No Effect | 5B | 100 | 120 |
| E | C12 diacid | 81.5 | Slight Softening | 5B | 160 | 160 |
| F | 80% C18 diacid-20% C9 diacid | 77.8 | No Effect | 5B | 20 | 40 |
| G | C18 diacid 1-amino-2-propanol | 62.9 | No Effect | 5B | 20 | <20 |
| H | C18 diacid low AV | 30.8 | No Effect | 2B | <20 | <20 |
| I | C18 diacid high AV | 77.9 | No Effect | 5B | 160 | 160 |

Coatings A, B and I met performance expectations while coatings C, D and E displayed adequate performance in most categories. The toughness of the coating as measured by impact resistance was diminished for the $C_{14}$ and $C_{16}$ diacid based resins. For the $C_{12}$ based resin, solvent resistance was affected. The longer chain $C_{18}$ and $C_{19}$ diacid resins produced the best performing coatings.

By "about" we mean within 10%, or within 5%, or within 1% of the value listed.

While at least one exemplary embodiment has been presented in the foregoing detailed description of the invention, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention, it being understood that various changes may be made in the function and arrangement of elements described in an exemplary embodiment without departing from the scope of the invention as set forth in the appended claims and their legal equivalents.

What is claimed is:

1. A powder coating resin comprising:
a first dicarboxylic acid terminated polymer having carboxylic acid groups on both ends and having ester and amide functionality comprising the reaction product of a C18 diacid with an amine alcohol, and optionally a diacid having less than 18 carbon atoms; or
a first acetoacetate terminated polyol comprising the reaction product of a first intermediate polyol with acetoacetic acid or an ester thereof, and wherein the first intermediate polyol comprises the reaction product of a C18 diacid with an amine alcohol, and optionally a diacid having less than 18 carbon atoms;
wherein the molecular weight of the resin is in the range of 475 g/mol to 10,000 g/mol, and wherein the first carboxylic acid terminated polymer or the first acetoacetate terminated polyol has an acid value in the range of 20-90 mg KOH/g; a peak melting point of 90-130° C.; and a melt viscosity of less than 4000 mPa's (4000 centipoise) at 125° C.;
the resin being in the form of a free-flowing powder.

2. The resin of claim 1 wherein the amine alcohol comprises ethanolamine, N-methyl ethanolamine, 1-amino-2-propanol, 2-amino-1-propanol, 3-amino-1-propanol, 3-amino-1-butanol, 4-amino-2-butanol, 3-amino-2-methyl-1-propanol, 3-amino-2-methyl-1-butanol, 4-amino-3-methyl-2-butanol, 2-(aminomethyl)-1-butanol, 3-amino-2,2-dimethyl-1-propanol, 4-amino-2-pentanol, 1-amino-3-pentanol, 3-amino-1-pentanol, 4-amino-2-methyl-2-butanol, 3-amino-3-methyl-1-butanol, 3-amino-2-(aminomethyl)-1-propanol diethanolamine, 3-amino-1,2-propanediol, 2-(aminomethyl)-1,3-propanediol, 3-amino-1,5-pentanediol, 2-amino-1,4-butanediol, or combinations thereof.

3. The resin of claim 1 wherein the amine alcohol comprises ethanolamine, diethanolamine, or combinations thereof.

4. The resin of claim 1 wherein the molecular weight of the resin in the range of 475 g/mol to 5,000 g/mol, and wherein the first carboxylic acid terminated polymer or the first acetoacetate terminated polymer has the acid value in the range of 30-70 mg KOH/g; the peak melting point of 90-130° C.; and the melt viscosity of less than 2000 mPa's (1000 centipoise) at 125° C.

5. The resin of claim 1 wherein the molecular weight of the resin in the range of 475 g/mol to 5,000 g/mol, and wherein the first carboxylic acid terminated polymer or the first acetoacetate terminated polyol has the acid value in the range of 40-50 mg KOH/g; the peak melting point of 90-130° C.; and the melt viscosity of less than 1000 mPa's (1000 centipoise) at 125° C.

* * * * *